(12) United States Patent
Love

(10) Patent No.: US 9,688,421 B1
(45) Date of Patent: Jun. 27, 2017

(54) AIRCRAFT COMPONENT REGIME RECOGNITION

(71) Applicant: Bell Helicopter Textron Inc., Fort Worth, TX (US)

(72) Inventor: Alan S Love, Dallas, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 9 days.

(21) Appl. No.: 14/974,875

(22) Filed: Dec. 18, 2015

(51) Int. Cl.
| | |
|---|---|
| *G01C 23/00* | (2006.01) |
| *B64F 5/00* | (2017.01) |
| *B64D 43/00* | (2006.01) |
| *B64C 27/46* | (2006.01) |
| *G07C 5/00* | (2006.01) |
| *B64C 27/12* | (2006.01) |
| *B64D 45/00* | (2006.01) |

(52) U.S. Cl.
CPC ............ *B64F 5/0045* (2013.01); *B64C 27/12* (2013.01); *B64C 27/46* (2013.01); *B64D 43/00* (2013.01); *G07C 5/00* (2013.01); *B64D 2045/0085* (2013.01)

(58) Field of Classification Search
CPC ............ B64D 2045/0085; B64D 43/00; B64F 5/0045; G07C 5/00; G07C 5/008; B64C 27/12; B64C 27/46

USPC .............. 701/3, 13, 14, 36, 29.1, 29.7, 33.4; 340/988, 425.5, 438, 439, 945
See application file for complete search history.

(56) References Cited

U.S. PATENT DOCUMENTS

| | | | |
|---|---|---|---|
| 8,682,509 B2 * | 3/2014 | Goodrich | G05B 23/0283 340/10.1 |
| 9,102,417 B1 * | 8/2015 | Young | A61B 5/18 |
| 2011/0054721 A1 * | 3/2011 | Goodrich | G05B 23/0283 701/14 |
| 2013/0211737 A1 * | 8/2013 | Batcheller | G01M 7/00 702/34 |

* cited by examiner

*Primary Examiner* — Gertrude Arthur Jeanglaud

(57) ABSTRACT

According to one embodiment, a method of assessing health of two or more components includes receiving, from an aircraft, a plurality of flight measurements, the aircraft comprising a first component and a second component. At least two flight regimes that the aircraft operated in at the same time are identified. The at least two flight regimes comprise a first flight regime and a second flight regime. One of the first flight regime and the second flight regime is assigned to the first component based on where the first flight regime and the second regime are located within a prioritized list of flight regimes associated with the first component. One of the first flight regime and the second flight regime is assigned to the second component based on where the first flight regime and the second regime are located within a prioritized list of flight regimes associated with the second component.

20 Claims, 3 Drawing Sheets

AIRCRAFT COMPONENT REGIME RECOGNITION

TECHNICAL FIELD

This invention relates generally to aircraft health, and more particularly, to an aircraft component regime recognition.

BACKGROUND

An aircraft may perform a variety of different missions. Some missions may subject the aircraft to more stress than other missions. For example, some missions may include high-stress maneuvers, whereas other missions may focus primarily on straight-and-level flight.

One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to track regime usage history at the component level instead of the vehicle level. A technical advantage of one embodiment may include the capability to identify several overlapping regimes and then select one of the overlapping regimes for each component based on the unique properties of that component. A technical advantage of one embodiment may include the capability to improve health assessment accuracy by recognizing regimes on a component-by-component basis instead of assigning regimes to the aircraft as a whole.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
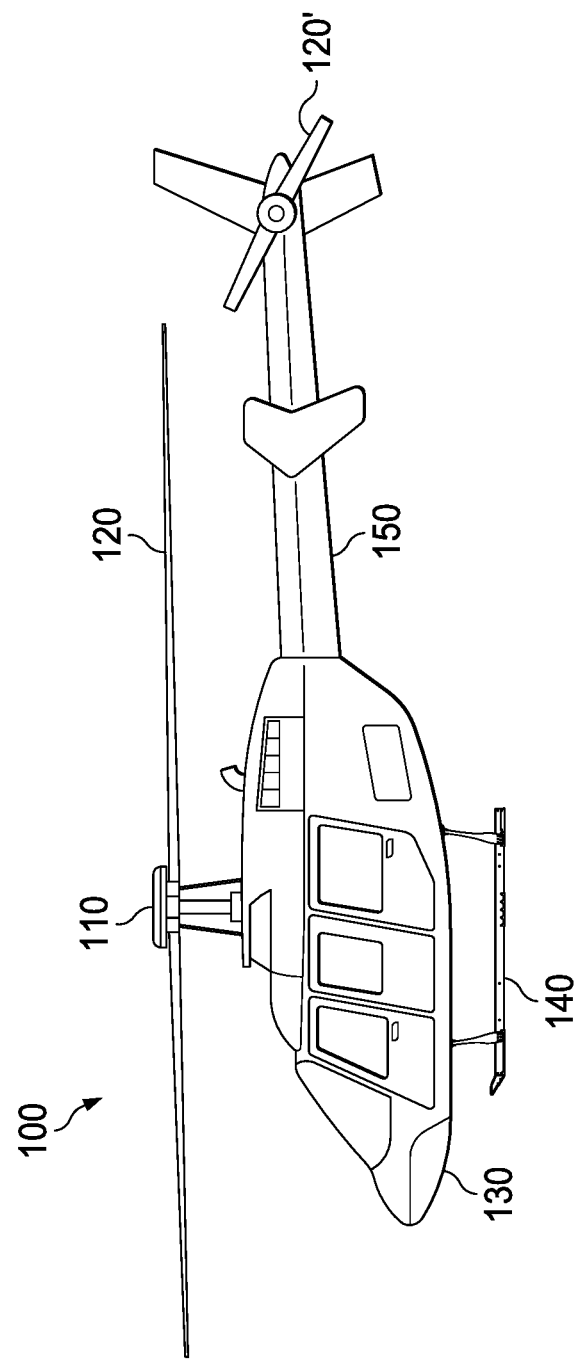
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

Rotorcraft 100 may perform a variety of different missions. Some missions may subject rotorcraft 100 to more stress than other missions. For example, some missions may include high-stress flight regimes (e.g., a high-speed turn with a high bank angle), whereas other missions may focus primarily on lower-stress flight regimes (e.g., straight-and-level flight). A flight regime may include any operating condition of an aircraft, including any scenario that could potentially change the health of an aircraft. Some flight regimes may be defined broadly (e.g., rotorcraft hover), whereas other flight regimes may be defined narrowly (e.g., a specific turn at specific angles in specific environmental conditions, etc.).

Figure 2:
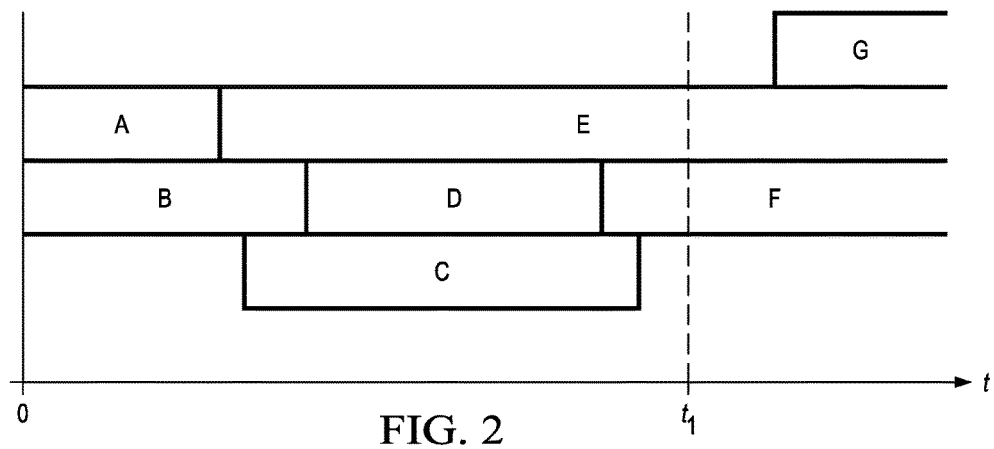
FIG. 2 shows different example regimes in which the rotorcraft of FIG. 1 may operate between time 0 and time t.

During operation of rotorcraft 100, rotorcraft 100 may operate in multiple regimes at the same time. For example, FIG. 2 shows different example regimes in which rotorcraft 100 may operate between time 0 and time t. The example of FIG. 2 shows seven regimes labeled A-G, but rotorcraft 100 may operate in more, fewer, or otherwise different regimes.

Regimes such as Regimes A-G may be identified in a variety of different ways. In one example embodiment, rotorcraft 100 is equipped with a variety of flight measurement sensors. Each flight measurement sensor may measure one or more facets of aircraft performance (e.g., airspeed, density altitude, bank angle, etc.). Regimes may be identified based on the measurements received from the flight measurement sensors located on that rotorcraft 100.

Figure 3:
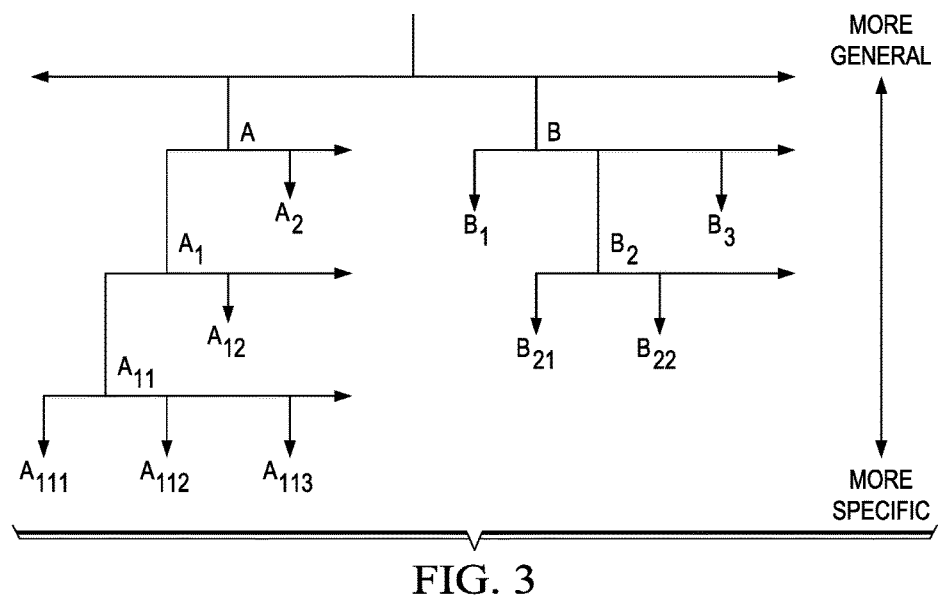
FIG. 3 shows a hierarchical definition scheme according to one example embodiment.

Regimes such as Regimes A-G may be defined in a variety of different ways. For example, FIG. 3 shows a hierarchical definition scheme 300 according to one example embodiment. In the example of FIG. 3, the regimes are arranged in a hierarchy from general to specific. For example, regime A includes sub-regimes A1, A2, and so forth; sub-regime A1 includes sub-sub-regimes A11, A12, and so forth; and sub-regime A11 includes sub-sub-sub-regimes A111, A112, A113, and so forth. In this example, the flight data may be used to eliminate regimes and narrow down the selection to the most specific regime possible. For example, if the flight data proves that rotorcraft 100 was operating in regimes A112 or A113, then flight regime A12 may be selected because it includes all of the possible flight regimes, A112 and A113.

Teachings of certain embodiments recognize that hierarchies may be defined such that all flight activity may fall into at least one regime within the hierarchy. For example, even if data is missing or flight activity is unrecognizable, the flight activity may be categorized into a highest-level regime in the hierarchy that encompasses all potential flight scenarios. The highest-level regime may be associated with damage assumptions about flight operations that are more extreme than the actual damage incurred, but such assumptions may be safer than just leaving the flight activities unassigned to regimes.

Returning to the example of FIG. 2, Regimes A-G are shown. Combining the concepts of FIGS. 2 and 3, FIG. 2 could be re-shown to include sub-regimes and so forth if flight data supports selection of more specific regimes.

Once regimes are identified, health assessments may be performed by analyzing how operating in these regimes causes damage to the aircraft. Typically, if an aircraft is operating in multiple regimes at the same time, the most damaging regime is selected for analysis.

In the example of FIG. 2, a time t1 is identified. At this time t1, rotorcraft 100 is operating in Regimes E and F. By way of example, assume that Regime E represents a right-turn maneuver and Regime F represents a control reversal. Generally speaking, control reversals are more damaging than right turns for an aircraft such as rotorcraft 100. Therefore, the damage caused to the aircraft would be determined by assessing how much damage was caused by operating in the control reversal regime.

This approach, however, ignores how operating within different regimes effects individual components installed on the aircraft. For example, although control reversals are probably more damaging to most aircraft components, but this may not be true for all aircraft components. Thus, performing regime recognition and health assessment on an aircraft level may lack the necessary accuracy. In addition, because aircraft parts are maintained and replaced on a component level, component-level regime recognition and health assessment may be more relevant to when an aircraft component should be inspected or replaced.

Accordingly, teachings of certain embodiments recognize the capability to track regime usage history at the component level instead of the vehicle level. Teachings of certain embodiments recognize the capability to identify several overlapping regimes and then select one of the overlapping regimes for each component. Returning to the example of Regimes E and F, Regime E might be selected for a first aircraft component, and Regime F might be selected for a second aircraft component. This might be the case, for example, if the first aircraft component is more sensitive to right turns and the second aircraft component is more sensitive to control reversals.

Figure 4:
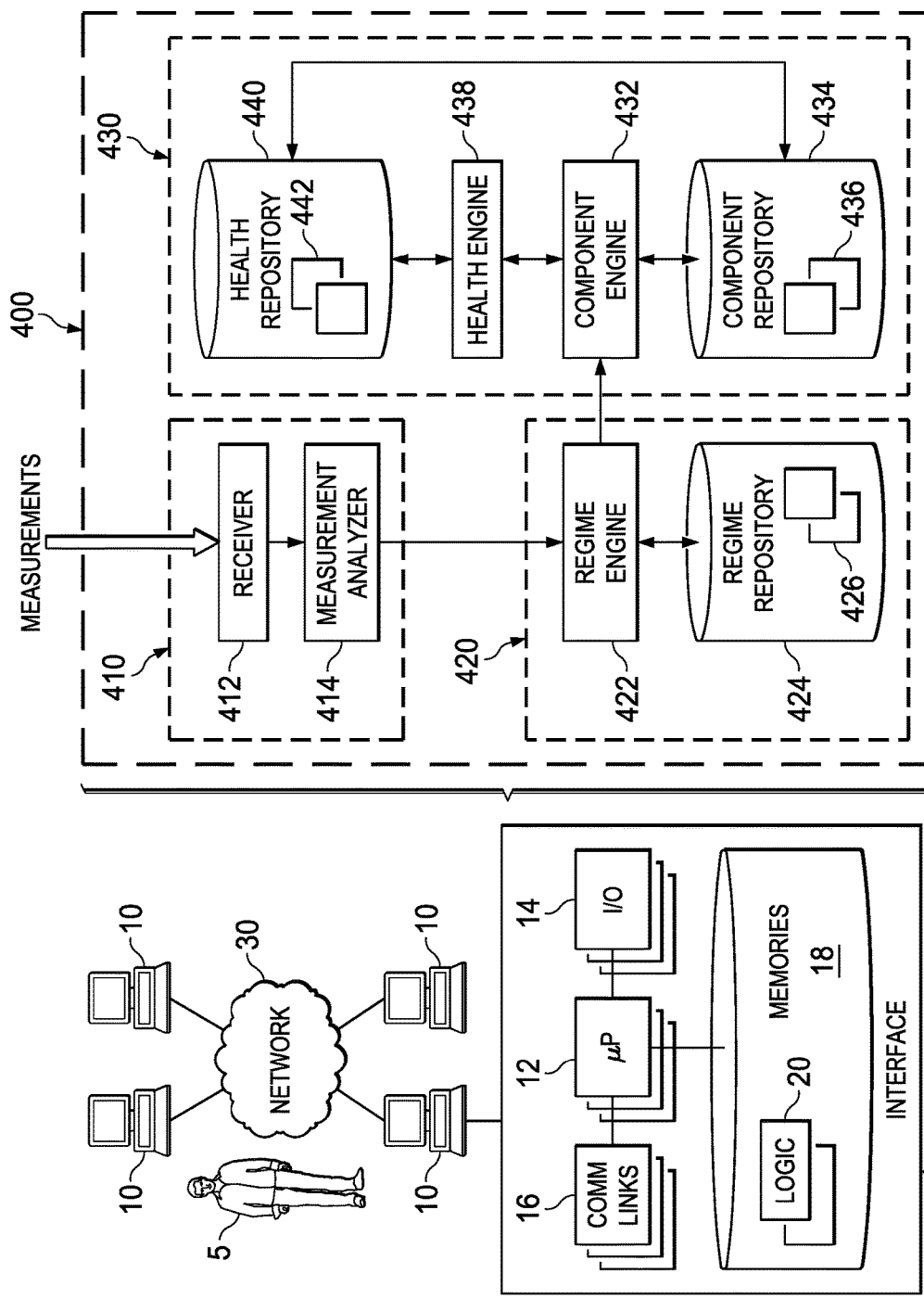
FIG. 4 shows an example system for assessing health of two or more components of an aircraft such as the rotorcraft of FIG. 1.

FIG. 4 shows a system 400 for assessing health of two or more components of an aircraft according to one example embodiment. In the example of FIG. 4, system 400 features a measurement system 410, a regime recognition system 420, and a health assessment system 430, which may be implemented by one or more computers 10 and may be accessed by a user 5. In operation, regime recognition system 420 may analyze measurements received from the aircraft via measurement system 410 and may identify different regimes based on the flight activity of the aircraft. Health assessment engine 430 may assign the identified regimes to individual components and perform health assessments based on these assignments.

Elements of system 400 may be installed on or off an aircraft such as rotorcraft 100. For example, in some embodiments, just measurement system 410 is installed on-board the aircraft, and regime recognition system 420 and health assessment system 430 are located in a remote location. In other embodiments, measurement system 410, regime recognition system 420, and health assessment system 430 are all installed on-board the aircraft. In some embodiments, elements of system 400 are integrated with the aircraft such that the aircraft and system 400 form a single, inter-operational system.

Users 5 may access system 400 through computer systems 10. For example, in some embodiments, users 5 receive outputs from health assessment system 430. Users 5 may include any individual, group of individuals, entity, machine, and/or mechanism that interacts with computer systems 10. Examples of users 5 include, but are not limited to, a service person, pilot, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10.

Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer regime cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer regime cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Measurement system 410 includes a receiver 412 and a measurement analyzer 414. Receiver 412 may receive measurements of flight profiles for an aircraft. In one example embodiment, receiver 412 receives the measurements from measurement sensors associated with the aircraft. Receiver 412 may be located on or off an aircraft. For example, in some embodiments, receiver 412 is located on an aircraft and is in communication with a physical storage device also located on the aircraft. This physical storage device may store measurements of flight parameters for later processing.

Measurement analyzer 414 receives and processes measurements from receiver 412. In one example embodiment, measurement analyzer 414 identifies loads and other information based on the received measurements that may be used for regime recognition. Measurement analyzer 414 may also identify timestamps corresponding to the received measurements so that regime recognition system 420 may determine the time spent in each regime or even create a time history of regimes.

Regime recognition system 420 includes a regime engine 422 and a regime repository 424. Regime repository stores flight regime records 426. Each flight regime record 426 defines a flight regime. A flight regime may be defined in a variety of ways. In one example embodiment, the flight regime records 426 may define the flight regimes in a hierarchy such as hierarchal definition scheme 300. The flight regime records 426 may also identify loads and other measurement information corresponding to the flight regimes.

Regime engine 422 identifies flight regimes that the aircraft operated in. In some embodiments, regime engine 422 identifies the flight regimes based on a comparison of the measurements received and processed by measurement analyzer 414 to the regime definitions stored in regime records 426.

Health assessment system 430 features a component engine 432, a component repository 434, a heath engine 438, and a health repository 440. Component repository 434 stores component records 436. Each component record 436 includes a prioritized list of flight regimes specific to a certain component. The component itself may be defined at any suitable level of specificity, from general (a fuselage) to specific (a bolt), from categorical (part model number XXXX) to individual (part serial number YYYYY).

Component engine 432 assigns the flight regimes identified by regime recognition system 420 to components of the aircraft. In some embodiments, the prioritized list for each component may help component engine 432 determine which regimes should be assigned to each component. For example, the prioritized list of flight regimes in a component record 436 may include an identification of which regimes cause greater damage to the component. If a component operated in two regimes at the same period of time, component engine 432 may assign the regime that causes greater damage to the component. Component engine 432 may reach this conclusion, for example, by consulting the prioritized list for the component and compare relative rankings of the different regimes to select the appropriate regime.

Health assessment engine 438 may determine the amount of damage inflicted on a component as a result of that component spending time in the flight regime assigned by component engine 432. In some embodiments, health assessment engine 438 may determine a change in health of the component resulting from this damage and adjust the remaining life of the component. Adjusting the remaining life of the component may include increasing or decreasing the amount of time (e.g., flight hours or some other measurement) until the component should be inspected, repaired, or replaced.

Health assessment engine 438 may store this health information in health records 442, which may be maintained in health repository 440. In some embodiments, health records 442 may correspond to component records 436 such that each health record 442 provides a health history of a component defined in a component record 436.

In operation, according to one example embodiment, regime recognition system 420 may determine that rotorcraft 100 operated in at least two regimes for a period of time. In this example, the rotorcraft has a plurality of components including first and second components. Component engine 432 may consult the prioritized lists for the first and second components stored in component records 436. Based on these prioritized lists, component engine 432 may assign one of the flight regimes to the first component based the prioritized list of flight regimes in the first component's component record and may assign one of the flight regimes to the second component based on the prioritized list of flight regimes in the second component's component record. In this example, different flight regimes may be assigned to the two components because the different flight regimes may have different effects on the components.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A system for assessing health of two or more components of an aircraft, the aircraft comprising a first component, a second component, and one or more flight measurement sensors operable to provide a plurality of flight measurements, the system comprising:
a regime recognition system comprising:
   a regime repository comprising a plurality of flight regime records, each flight regime record defining a flight regime; and
   a regime engine configured to identify at least two flight regimes that the aircraft operated in at the same time, the regime engine configured to identify the two flight regimes from the plurality of flight regimes based on a comparison of the plurality of measurements to the plurality of flight regime records, the at least two flight regimes comprising a first flight regime and a second flight regime; and a
health assessment system comprising:
   a component repository comprising a plurality of component records, each component record corresponding to a component of the aircraft and comprising a prioritized list of flight regimes, the plurality of component records comprising a first component record specific to the first component and a second component record specific to the second component; and
   a component engine configured to:
      assign one of the first flight regime and the second flight regime to the first component based on where the first flight regime and the second regime are located within the prioritized list of flight regimes in the first component's component record; and
      assign one of the first flight regime and the second flight regime to the second component based on where the first flight regime and the second regime are located within the prioritized list of flight regimes in the second component's component record.

2. The system of claim 1, wherein the flight regime assigned to the second component is different than the flight regime assigned to the first component.

3. The system of claim 1, wherein the aircraft is a rotorcraft.

4. The system of claim 3, wherein the aircraft comprises a body, a power train coupled to the body and comprising a power source and a drive shaft coupled to the power source, a hub, and a rotor blade coupled to the hub.

5. The system of claim 4, wherein the first component is selected from the group consisting of the body, the power train, the power source, the drive shaft, the hub, and the rotor blade.

6. The system of claim 1, wherein the system comprises the aircraft.

7. The system of claim 6, wherein at least one of the regime recognition system and the health assessment system are installed onboard the aircraft.

8. The system of claim 1, wherein the prioritized list of flight regimes in the first component's component record comprises an identification of which regimes cause greater damage to the first component.

9. The system of claim 8, wherein assigning one of the first flight regime and the second flight regime to the first component comprises assigning one of the first flight regime and the second flight regime to the first component based on which flight regime causes greater damage to the first component.

10. The system of claim 1, the health assessment system further comprising a health engine configured to:
   determine an amount of damage resulting from operation of the first component within the flight regime assigned to the first component; and
   determine an amount of damage resulting from operation of the second component within the flight regime assigned to the second component.

11. The system of claim 10, the health engine further configured to:
   determine a change in health of the first component resulting from the damage resulting from operation of the first component within the flight regime assigned to the first component; and
   determine a change in health of the second component resulting from the damage resulting from operation of the second component within the flight regime assigned to the second component.

12. The system of claim 11, the health assessment system further comprising a health repository configured to store a plurality of health records identifying components of the aircraft and changes in health corresponding to those components.

13. A method of assessing health of two or more components of an aircraft, comprising:
   receiving, from an aircraft, a plurality of flight measurements, the aircraft comprising a first component and a second component;
   identifying at least two flight regimes that the aircraft operated in at the same time, the at least two flight regimes comprising a first flight regime and a second flight regime;
   assigning one of the first flight regime and the second flight regime to the first component based on where the first flight regime and the second regime are located within a prioritized list of flight regimes associated with the first component; and
   assigning one of the first flight regime and the second flight regime to the second component based on where the first flight regime and the second regime are located within a prioritized list of flight regimes associated with the second component.

14. The method of claim 13, wherein identifying the at least two flight regimes comprises identifying the two flight regimes from a plurality of flight regimes based on a comparison of the plurality of measurements to a plurality of flight regime records, each flight regime record defining a flight regime.

15. The method of claim 13, wherein the flight regime assigned to the second component is different than the flight regime assigned to the first component.

16. The method of claim 13, wherein the prioritized list of flight regimes associated with the first component comprises an identification of which regimes cause greater damage to the first component.

17. The method of claim 16, wherein assigning one of the first flight regime and the second flight regime to the first component comprises assigning one of the first flight regime and the second flight regime to the first component based on which flight regime causes greater damage to the first component.

18. The method of claim 13, further comprising:

determining an amount of damage resulting from operation of the first component within the flight regime assigned to the first component; and determining an amount of damage resulting from operation of the second component within the flight regime assigned to the second component.

19. The method of claim 18, further comprising:

determining a change in health of the first component resulting from the damage resulting from operation of the first component within the flight regime assigned to the first component; and determining a change in health of the second component resulting from the damage resulting from operation of the second component within the flight regime assigned to the second component.

20. The method of claim 13, wherein the aircraft is a rotorcraft.

* * * * *